US012128320B2

(12) United States Patent
Sawamura et al.

(10) Patent No.: US 12,128,320 B2
(45) Date of Patent: *Oct. 29, 2024

(54) RANKING LIST DISPLAY METHOD IN GAME SYSTEM, AND SYSTEM FOR EXECUTING THE METHOD

(71) Applicant: GREE, Inc., Tokyo (JP)

(72) Inventors: Maya Sawamura, Tokyo (JP); Takuya Kai, Tokyo (JP); Kenji Iguchi, Tokyo (JP); Yushi Takagi, Tokyo (JP); Toshiharu Yabe, Tokyo (JP)

(73) Assignee: GREE, Inc., Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 17/564,891

(22) Filed: Dec. 29, 2021

(65) Prior Publication Data

US 2022/0118367 A1 Apr. 21, 2022

Related U.S. Application Data

(63) Continuation of application No. 15/681,713, filed on Aug. 21, 2017, now Pat. No. 11,247,131, which is a
(Continued)

(30) Foreign Application Priority Data

Feb. 21, 2013 (JP) .................................. 2013-031903

(51) Int. Cl.
*A63F 13/798* (2014.01)
*A63F 13/2145* (2014.01)
(Continued)

(52) U.S. Cl.
CPC ........ *A63F 13/798* (2014.09); *A63F 13/2145* (2014.09); *A63F 13/537* (2014.09); *A63F 13/92* (2014.09)

(58) Field of Classification Search
CPC .. A63F 13/214; A63F 13/537; A63F 13/5375; A63F 13/798; A63F 13/92;
(Continued)

(56) References Cited

U.S. PATENT DOCUMENTS 5,337,405 A 8/1994 Lindauer
5,506,951 A 4/1996 Ishikawa
(Continued)

FOREIGN PATENT DOCUMENTS

JP 6-186059 A 7/1994
JP 9-325879 A 12/1997
(Continued)

OTHER PUBLICATIONS

Japanese Office Action issued on Jun. 8, 2020 in Patent Application No. 2019-111530 (with English translation), 12 pages.
(Continued)

*Primary Examiner* — Milap Shah
(74) *Attorney, Agent, or Firm* — Oblon, McClelland, Maier & Neustadt, L.L.P.

(57) ABSTRACT

A ranking list display method in a game system, which can easily execute ranking confirmation of a user, who is a ranking confirmation target, such as the user himself/herself, a friend or a rival, is provided. The ranking list display method in a game system includes determining a position in a ranking list of a game of a user who is a ranking confirmation target in relation to a display range of the ranking list which is currently displayed on a terminal, and displaying a pointer, which corresponds to the determined position in the ranking list of the user who is the ranking confirmation target in relation to the display range of the ranking list which is currently displayed on the terminal, within the display range of the ranking list which is currently displayed on the terminal.

16 Claims, 15 Drawing Sheets

Related U.S. Application Data continuation of application No. 15/386,971, filed on Dec. 21, 2016, now Pat. No. 9,737,816, which is a continuation of application No. 14/174,291, filed on Feb. 6, 2014, now Pat. No. 9,561,434.

(51) Int. Cl.
    *A63F 13/537*    (2014.01)
    *A63F 13/92*     (2014.01)

(58) Field of Classification Search
CPC .. G06F 3/04817; G06F 3/0482; G06F 3/0485; G06F 3/04855; A63D 5/04
See application file for complete search history.

(56) References Cited

U.S. PATENT DOCUMENTS

| | | | |
|---|---|---|---|
| 6,147,683 | A | 11/2000 | Martinez |
| 6,174,236 | B1 | 1/2001 | Tsuda |
| 6,285,366 | B1 | 9/2001 | Ng |
| 6,366,302 | B1 | 4/2002 | Crosby |
| 6,424,359 | B1 | 7/2002 | Kobayashi |
| 6,734,883 | B1 | 5/2004 | Wynn |
| 6,839,435 | B1 | 1/2005 | Iijima |
| 8,220,021 | B1 | 7/2012 | Look |
| 8,375,334 | B2 | 2/2013 | Nakano |
| 8,845,437 | B2 | 9/2014 | Lim |
| 9,134,885 | B2 | 9/2015 | Horiuchi |
| 9,299,064 | B1 | 3/2016 | Liu |
| 9,561,434 | B2 | 2/2017 | Sawamura |
| 9,737,816 | B2 | 8/2017 | Sawamura |
| 11,247,131 | B2 * | 2/2022 | Sawamura ............ A63F 13/537 |
| 2003/0093168 | A1 | 5/2003 | Nagaoka |
| 2004/0100479 | A1 | 5/2004 | Nakano |
| 2004/0225386 | A1 | 11/2004 | Thompson |
| 2005/0091604 | A1 | 4/2005 | Davis |
| 2006/0136838 | A1 | 6/2006 | Nurmi |
| 2007/0173321 | A1 | 7/2007 | Shen |
| 2007/0229471 | A1 | 10/2007 | Kim |
| 2008/0113805 | A1 | 5/2008 | David |
| 2009/0169060 | A1 | 7/2009 | Faenger |
| 2011/0099490 | A1 | 4/2011 | Barraclough |
| 2011/0250965 | A1 | 10/2011 | Kulas |
| 2011/0250969 | A1 | 10/2011 | van Os |
| 2011/0296004 | A1 | 12/2011 | Swahar |
| 2012/0030614 | A1 | 2/2012 | Tuli |
| 2012/0075352 | A1 | 3/2012 | Mizutani |
| 2012/0120115 | A1 | 5/2012 | Sato |
| 2012/0322561 | A1 | 12/2012 | Kohlhoff |
| 2013/0013094 | A1 | 1/2013 | Parks |
| 2013/0181941 | A1 | 7/2013 | Okuno |
| 2013/0288788 | A1 | 10/2013 | Lim |
| 2013/0314350 | A1 | 11/2013 | Tobinaga |
| 2014/0173504 | A1 | 6/2014 | Gup |
| 2015/0242434 | A1 | 8/2015 | Wellenstein |

FOREIGN PATENT DOCUMENTS

| | | | |
|---|---|---|---|
| JP | 2002-526824 | A | 8/2002 |
| JP | 2002-346235 | A | 12/2002 |
| JP | 2004-174090 | A | 6/2004 |
| JP | 2008-12221 | A | 1/2008 |
| JP | 2012-213492 | | 11/2012 |
| JP | 2014-12051 | A | 1/2014 |
| JP | 5409876 | B1 | 2/2014 |
| JP | 6280093 | B2 | 2/2018 |

OTHER PUBLICATIONS

Japanese Office Action issued on Mar. 11, 2020 in Patent Application No. 2018-167254 (with English translation), 9 pages.
Japanese Office Action issued on Sep. 3, 2019 in Patent Application No. 2018-167254 (with English translation), 8 pages.
Japanese Office Action issued on May 12, 2020 in Patent Application No. 2019-072333 (with English translation), 6 pages.
Japanese Office Action issued on Apr. 3, 2020 in Patent Application No. 2019-036527 (with English translation), 6 pages.
Japanese Office Action issued on May 26, 2020 in Patent Application No. 2015-181882 (with English translation), 6 pages.
Office Action dated Dec. 9, 2020 issued in corresponding Japanese Patent Application No. 2019-111530 with English Translation.
Japanese Office Action issued on Jan. 9, 2019 in Patent Application No. 2018-006022 (with English translation), 7 pages.
Decision Denying Institution of Post-Grant Review 35 U.S.C. § 324(a), United States Patent and Trademark Office, (Case No. PGR2018-00064) of U.S. Pat. No. 9,737,816 B2, Oct. 18, 2018, 11 pages.
Patent Owner's Preliminary Response Pursuant to 37 CFR § 42.207{a), filed in Post Grant Review {Case No. 2018-00064) of U.S. Pat. No. 9,737,816, Aug. 21, 2018, 38 pages.
Declaration of Brnce McNair (Exhibit 2001 filed in Post Grant Review (Case No. 2018-00064) of U.S. Pat. No. 9,737,816, Aug. 21, 2018, 62 pages.
Android Compatibility Program, Android 2.2 Compatibility Definition, Google inc. (2010), filed in Posl Grant Review (Exhibit 2002 of Post Grant Review (Case No. 2018-00064) of U.S. Pat. No. 9,737,816. Aug. 21, 2018, 20 pages.
Petition for Post Grant Review of U.S. Pat. No. 9,737,816, May 2, 2018.
Microsoft Computer Dictionary, 4th edition, Microsoft Prnss, A Division of Microsoft Corporation, ISBN 0-7356-06 •15-3, 1999 (Exhibit 1003 of Petition for Post Grant Review of U.S. Pat. No. 9,737,816).
Bahr, USPTO Memorandum on Recent Subject Matter Eligibility Decisions, Apr. 2, 2018 (Exhibit 1004 of Petition for Post Grant Review of U.S. Pat. No. 9,737,816).
Bahr, USPTO Memorandum on Changes in Examination Procedure Pertaining to Subject Matter Eligibility, Recent Subject Matter E!igibi!rty Decision (*Berkheimer* v. *HP, fnc.*), Apr. 9, 2018 {Exhibit •1005 of Petition for Post Grnnt Review of U.S. Pat. No. 9,737,816).
Bahr, USPTO MemoramJum 011 *McRO. Inc. dba Planet Blue* v. *Bandai Namco Garnes America Inc.* aml *BASCOM Global internet Services* v. *AT&T Mobility LLC*, Nov. 2, 2016 (Exhibit 1006 of Petition for Post Grant Review of U.S. Pat. No. 9,737,816).
Update: Subject Matter Eiiglbmty, Jul. 2015 (Exhibit 1007 of Petition for Post Grant Review of U.S. Pat. No. 9,737,816}.
Bahr, USPTO Memorandum on Recent Subject Matter Eligibility Decisions (*Enflsll, LLC* v. *Microsoft Corp.* and *TU Communications LLC* v. *A. V. Automotive, LLC*), May 19, 2016 {Exhibit 1008 of Petition for Post Grant Review of U.S. Pat. No. 9,737,816).
Subject Matter Eligibility Examples: Business Methods, Dec. 2016 {Exhibit1009 of Petition for Post Grant Review of U.S. Pat. No. 9,737,816).
Certified Translation of Japanese Application No. 2013-031903. filed on Feb. 21, 2013 (Exhibit 1010 of Petition for Post Grant Review of U.S. Pat. No. 9,737,816).
Japanese Office Action issued Mar. 25, 2014 in Patent Application No. 2013-031903 with English Translation.
Office Action issued Oct. 21, 2014 in Japanese Patent Application No. 2013-031903 (with English language translation).
Japanese Office Action issued Aug. 25, 2015 in Japanese Patent Application No. 2013-031903 (with English translation).
Japanese Office Action issued Sep. 6, 2022 in Japanese Patent Application No. 2021-041073 (with unedited computer generated English translation), 4 pages.

\* cited by examiner

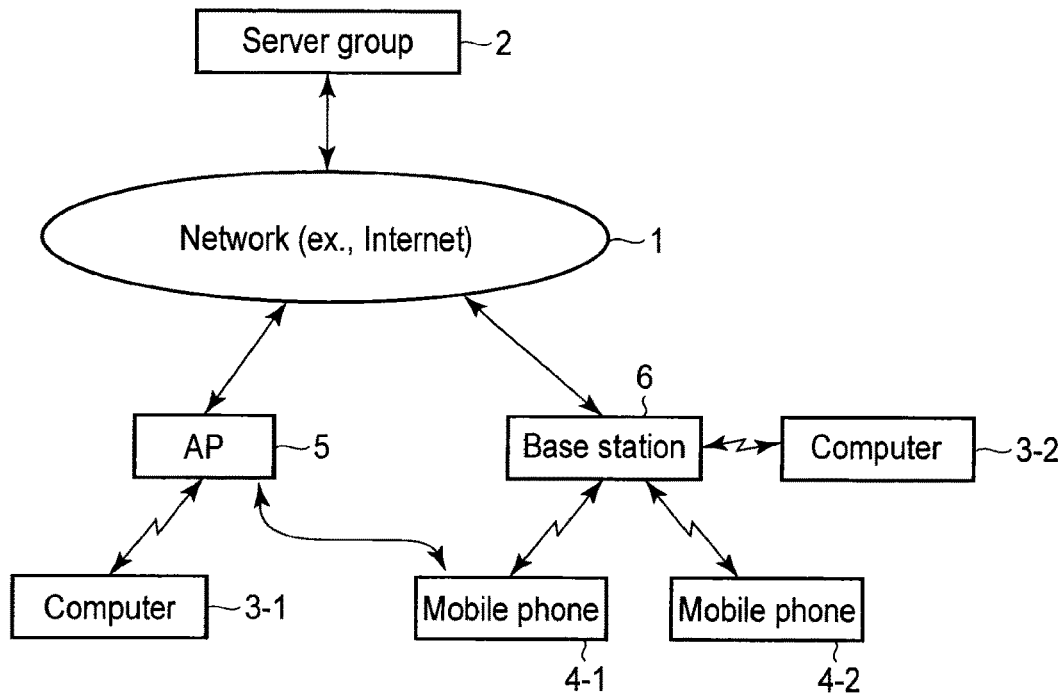
F I G. 1
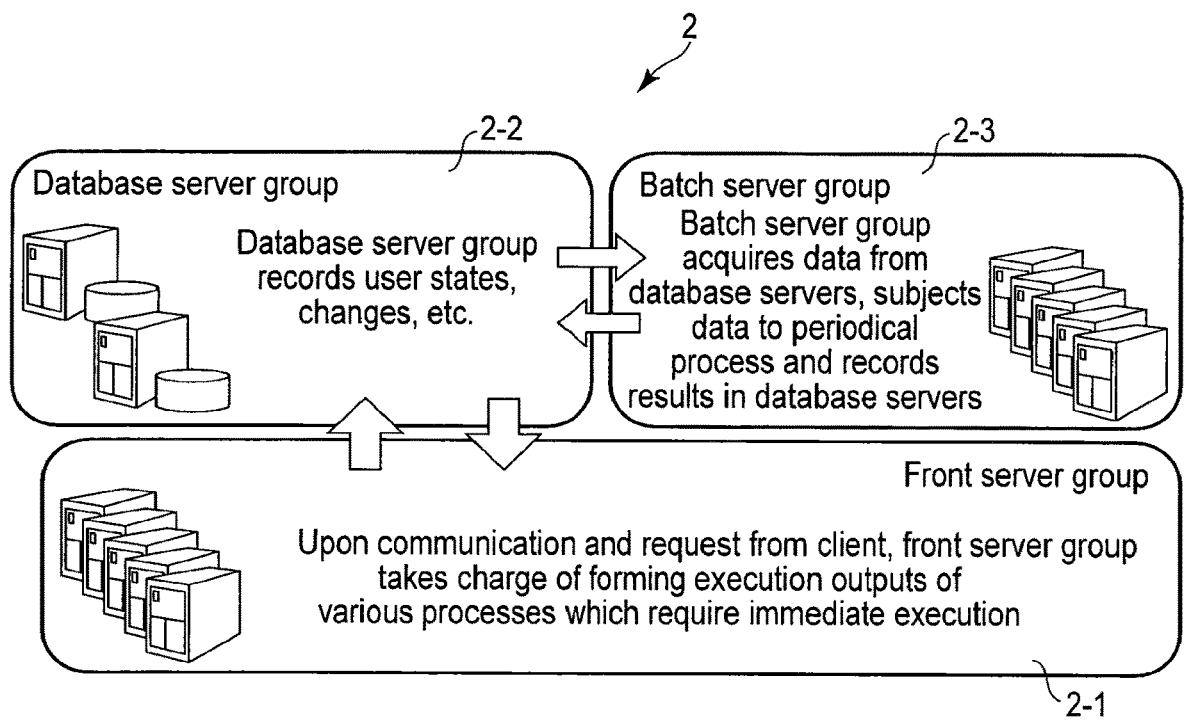
F I G. 2

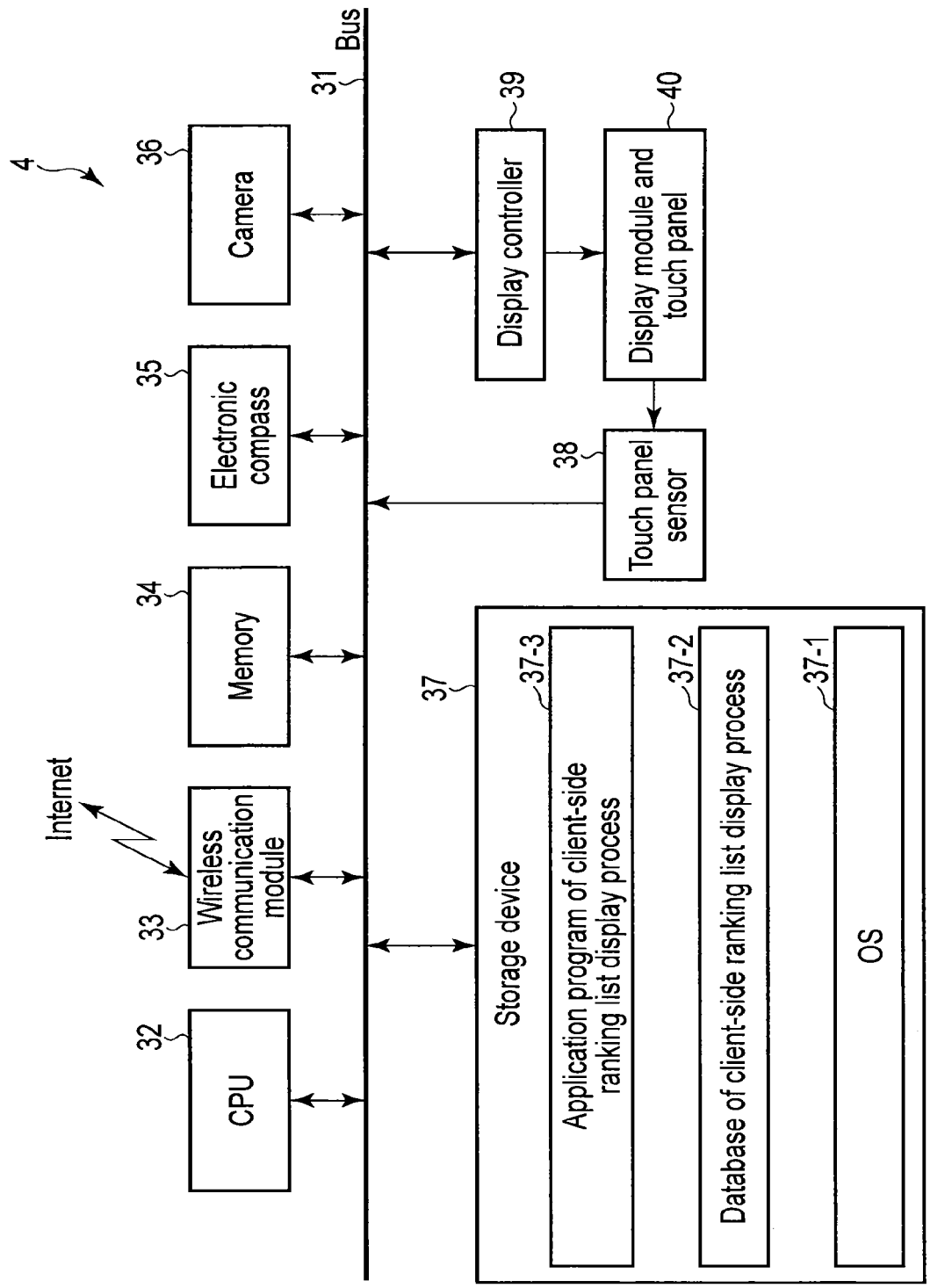
F I G. 4

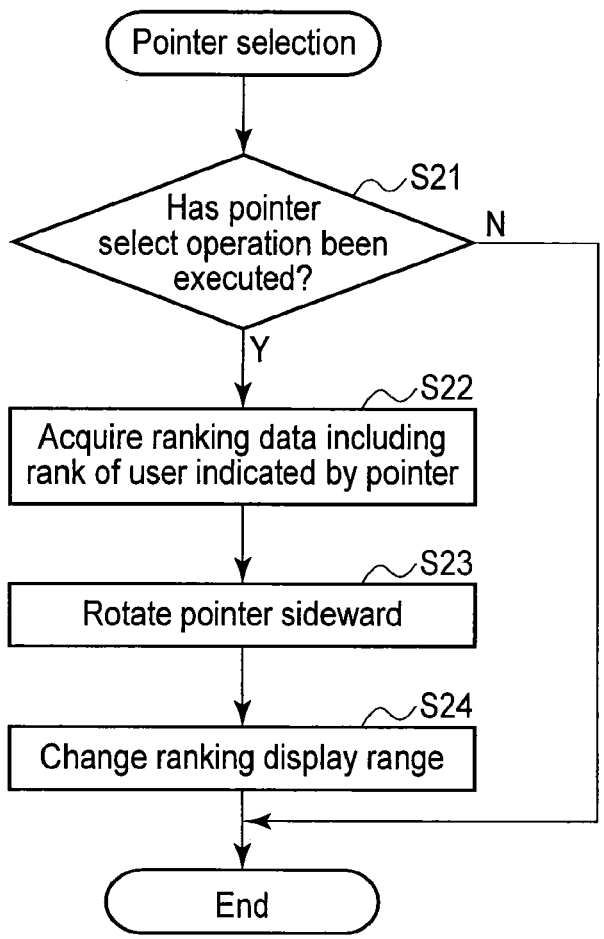
F I G. 10

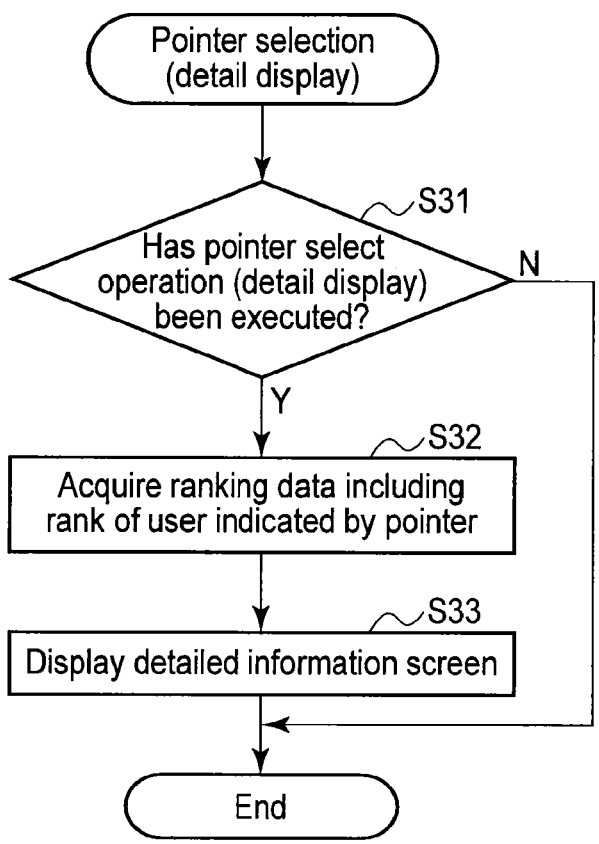
F I G. 12

RANKING LIST DISPLAY METHOD IN GAME SYSTEM, AND SYSTEM FOR EXECUTING THE METHOD

CROSS-REFERENCE TO RELATED APPLICATIONS

This application is a continuation application which claims the benefit of priority under 35 U.S.C. § 120 of U.S. application Ser. No. 15/681,713, filed Aug. 21, 2017 which is a continuation of application Ser. No. 15/386,971, filed Dec. 21, 2016 (now U.S. Pat. No. 9,737,816), which is a continuation of application Ser. No. 14/174,291, filed Feb. 6, 2014 (now U.S. Pat. No. 9,561,434) and is based upon and claims the benefit of priority from Japanese Patent Application No. 2013-031903, filed on Feb. 21, 2013, the entire contents of which are incorporated herein by reference.

BACKGROUND OF THE INVENTION

1. Field of the Invention

The present invention relates to a ranking list display method in a game system, and a system for executing the method.

2. Description of the Related Art

With the development of mobile phones and network technologies, it is widely practiced to collect ranking information of games of players on a server side, and to display the ranking information on a client side (Patent document 1).

In particular, in recent years, with recent popularity of social networking services (SNS), the number of users of games using the SNS reaches several millions in some cases. This being the case, the quantity of ranking information is enormous, the work of a user for confirming the ranking of the user himself/herself, a rival or a friend is time-consuming.

As a method for solving this problem, there is known a technique of acquiring ranking information in proximity to the game score of the user himself/herself (i.e. ranking information which meets a condition of proximity), and visually displaying a relative difference between this user and other users in accordance with game scores (Patent document 2).

CITATION LIST

Patent Literature

Patent document 1: Jpn. Pat. Appln. KOKAI Publication No. 2008-12221
Patent document 2: Jpn. Pat. Appln. KOKAI Publication No. 2012-213492

BRIEF SUMMARY OF THE INVENTION

However, even in the technique of visually displaying a relative difference between the user and other users in accordance with game scores, in the above-described game using the SNS, there are not only the user himself/herself, but also friends relating to the user, and rivals whom the user cares about, and the work of confirming the rankings of these persons is time-consuming. If the work of confirming the rankings becomes time-consuming, such a problem arises that the ratio of withdrawal of users of the game itself increases.

The present invention has been made in consideration of the above circumstances, and the object of the invention is to provide a ranking list display method in a game system, which can easily execute ranking confirmation of a user, who is a ranking confirmation target, such as the user himself/herself, a friend or a rival, and a system for executing this method.

According to a first invention of the present invention, a ranking list display method in a game system includes determining a position in a ranking list of a game of a user who is a ranking confirmation target in relation to a display range of the ranking list which is currently displayed on a terminal; and displaying a pointer, which corresponds to the determined position in the ranking list of the user who is the ranking confirmation target in relation to the display range of the ranking list which is currently displayed on the terminal, within the display range of the ranking list which is currently displayed on the terminal.

According to the present invention, it is possible to easily execute ranking confirmation of a user, who is a ranking confirmation target, such as the user himself/herself, a friend or a rival.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view for explaining an environment in which a server group 2, computers 3-1 and 3-2 and mobiles phones 4-1 and 4-2 for realizing a ranking list display method in a game system according to an embodiment of the invention are used.

FIG. 2 is a view illustrating an example of the structure of the server group 2 in the embodiment of the invention.

FIG. 4 is a view illustrating the configuration of a mobile phone (smartphone) 4 (4-1, 4-2) in the embodiment of the invention.

FIG. 10 is a flowchart for describing a transition of a screen in a case where a pointer displayed on the screen has been tapped.

FIG. 12 is a flowchart for describing a method of referring to detailed information from a pointer indicative of the setup target user on the ranking.

DETAILED DESCRIPTION OF THE INVENTION

Figure 3:
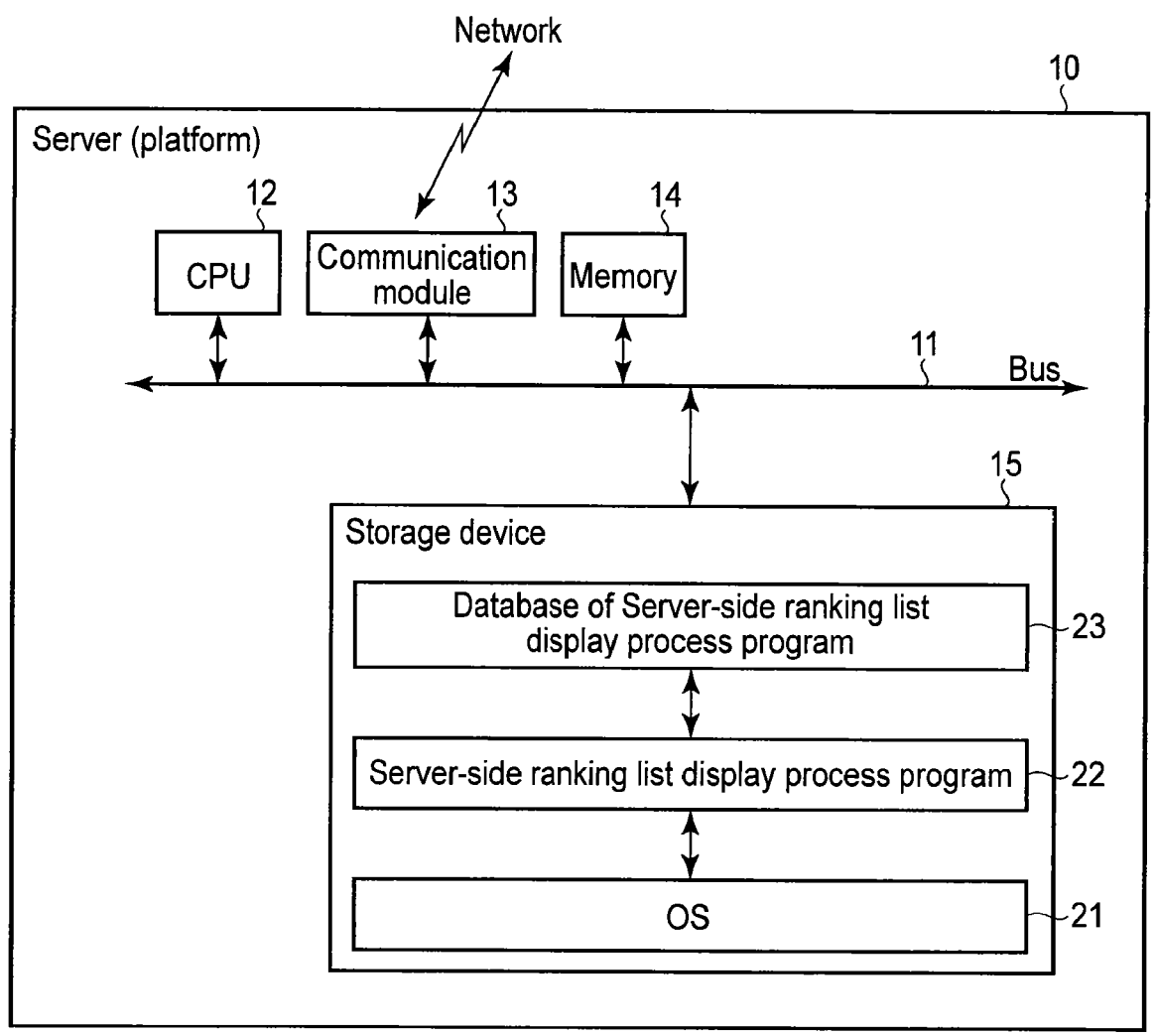
FIG. 3 is a view illustrating the configuration of a server 10 which executes an operation for realizing the ranking list display method in the game system according to the embodiment of the invention.

Referring to the accompanying drawings, a ranking list display method in a game system according to an embodiment of the invention will now be described.

FIG. 1 is a view for explaining an environment in which a server group 2, computers 3-1 and 3-2 and mobiles phones 4-1 and 4-2 for realizing the ranking list display method in the game system according to the embodiment of the invention are used.

As illustrated in FIG. 1, the server group 2 for executing a main process for realizing the ranking list display method in the game system according to the embodiment of the invention, and a plurality of computers 3-1 and 3-2 and mobile phones 4-1 and 4-2, which are used by users who play in the game system according to the embodiment, are connected to a network 1 such as the Internet via an access point 5 or a base station 6.

The server group 2 may be realized by a single computer, or may be composed of a plurality of computers, such as a Web server, a process server and a database server, in association with respective functions. In this embodiment of the invention, the configuration of the server group 2 is not specified.

The computers 3-1 and 3-2 include a mobile computer, a laptop computer, or a tablet terminal, as well as an ordinary desktop computer.

The mobile phones 4-1 and 4-2 include a smartphone or a feature phone, and are mobile phones which operate on OSs such as Android (trademark) or iOS (trademark).

FIG. 2 is a view illustrating an example of the structure of the server group 2 in the embodiment of the invention.

As illustrated in FIG. 2, for example, the server group 2 is composed of a front server group 2-1, a database server group 2-2 and a batch server group 2-3.

The front server group 2-1 is in charge of forming execution outputs of various processes which are immediately executable upon receiving a communication request with a client. The front server group 201 is, for instance, a Web server.

The database server group 2-2 is a process server which executes, for example, a core process of a social network service process, as well as the ranking list display method in the game system according to the embodiment.

The batch server group 2-3 periodically acquires data from the database server group 2-2, executes a periodic process on the data, and records the result in the database server group 2-2.

In the present embodiment, for the purpose of simple description, a description is given of the case in which an operation is performed on a single server 10 (platform) shown in FIG. 3. However, needless to say, the configuration of the server is not limited to this example.

FIG. 3 is a view illustrating the configuration of the server 10 which executes an operation for realizing the ranking list display method in the game system according to the embodiment of the invention.

As illustrated in FIG. 3, in the server 10, a CPU 12, a communication module 13, a memory 14 and a storage device 15 are connected to a bus 11.

The CPU 12 cooperates with a server-side ranking list display process program 22 relating to the embodiment of the invention, which is stored in the storage device 15, and the CPU 12 executes the ranking list display method in the game system according to the embodiment and also executes overall control of the server 10.

The communication module 13 executes control of communication with an external device such as a client via the network 1.

The memory 14 is used as, for example, a work area which is needed at a time of executing the server-side ranking list display process program 22.

The storage device 15 stores programs and data which are necessary for an object display process, and is, for example, a large-capacity storage device such as a hard disk drive (HDD), an optical disc drive, a DVD, or an MO. The storage device 15 stores an OS (operating system) 21, the server-side ranking list display process program 22, and a database 23 of the server-side ranking list display process program 22.

The OS 21 is a program for realizing basic functions of the server 10.

The server-side ranking list display process program 22 is a program for realizing the ranking list display method in the game system according to the embodiment of the invention. In the meantime, the ranking list display method in the game system of the embodiment is executed mainly by the server-side ranking list display process program 22, and display-related processes are executed on the client side. However, the process execution is not limited to this example, and a part or all of the ranking list display process, which is executed on the server side, may be executed on the client side.

The database 23 of the server-side ranking list display process program 22 stores various data which are used in the ranking list display method in the game system of the embodiment which is realized by the server-side ranking list display process program 22.

FIG. 4 is a view illustrating the configuration of the mobile phone (smartphone) 4 (4-1, 4-2) in the embodiment of the invention.

As illustrated in FIG. 4, a CPU 32, a wireless communication module 33, a memory 34, an electronic compass 35, a camera 36, a storage device 37, a touch panel sensor 38 and a display controller 39 are connected to a bus 31.

The CPU 32 cooperates with a client-side ranking list display process program 37-3 relating to the embodiment of the invention, which is stored in the storage device 37, and the CPU 32 executes the ranking list display method in the game system according to the embodiment and also executes overall control of the mobile phone 4.

The wireless communication module 33 executes control of communication with an external device such as a server via the network 1. In addition, the wireless communication module 33 includes wireless communication functions of wireless LAN, Bluetooth (trademark) and Wi-Fi (trademark).

The memory 34 is used as, for example, a work area which is needed at a time of executing the client-side ranking list display process program 37-3.

The electronic compass 35 includes a geomagnetic sensor, and measures an azimuth direction.

The camera 36 includes an image-capturing function, and stores a captured image in the storage device 37.

The storage device 37 stores programs and data which are necessary for a client-side ranking list display process relating to the embodiment, and is a storage device such as a flash memory.

The storage device 37 stores an OS (operating system) 37-1, a database 37-2 of the client-side ranking list display process program 37-3, and the client-side ranking list display process program 37-3.

The OS 37-1 is a program for realizing basic functions of the mobile phones 4.

The database 37-2 manages data which are used in the ranking list display method in the client-side game system by the client-side ranking list display process program 37-3.

In the present embodiment, it is presupposed that only those of the information pieces stored in the server-side database 23, which relate to the user of the mobile phone 4, are stored in the database 37-2. However, the database 37-2 may store only a part of these information pieces, or may store other information.

The client-side ranking list display process program 37-3 is a program which controls a client-side process of the ranking list display method in the game system according to the embodiment.

The touch panel sensor 38 is a sensor which detects a user action on a touch panel of a display module 40 of the mobile phone 4.

The display controller 39 executes display control of the display module 40.

Figure 5:
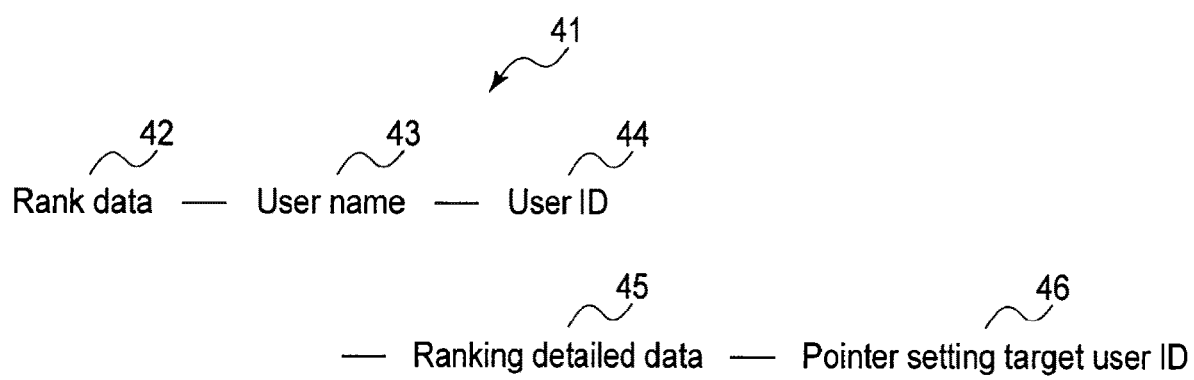
FIG. 5 is a view illustrating ranking data which is stored in a database 23 of a server-side ranking list display process program 22.

FIG. 5 is a view illustrating ranking data which is stored in the database 23 of the server-side ranking list display process program 22. As illustrated in FIG. 5, ranking data 41 includes rank data 42, a user name 43, a user ID 44, ranking detailed data 45, and a pointer setup target user ID 46, and these are mutually associated and stored.

The ranking detailed data 45 is detailed data of the user, such as points in a game.

The pointer setup target user ID 46 designates a user who becomes a target of a pointer which is displayed on the ranking list, and is stored in association with the user ID 44. As regards the designation of the pointer setup target user ID 46, a user ID of a user himself/herself, a rival or a friend in the game can be designated. In addition, not only the user ID of the user himself/herself, but also a plurality of user IDs can be designated. The rank of the user ID 44, which is managed by the pointer setup target user ID 46, is indicated by a pointer (icon).

Figure 6:
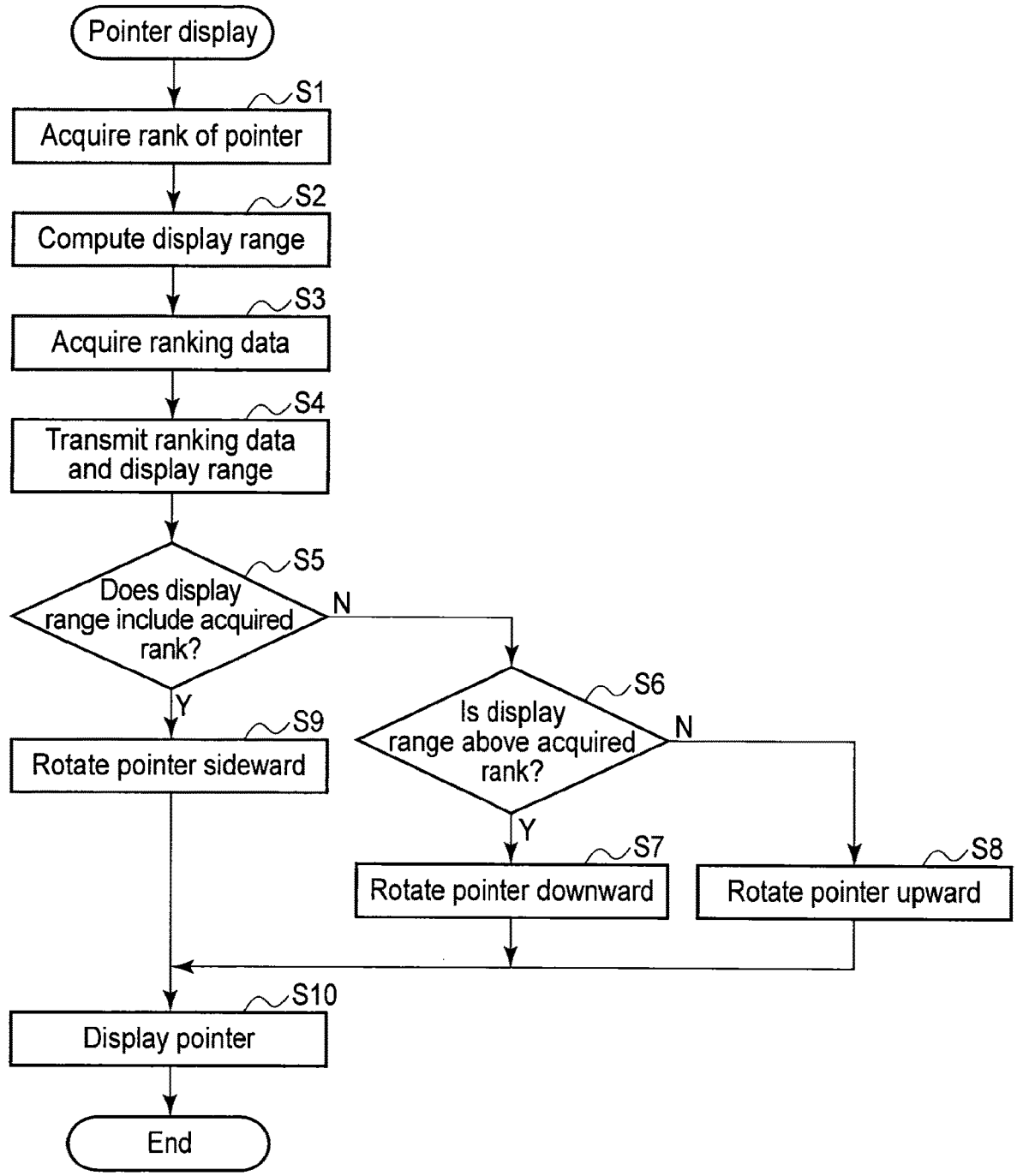
FIG. 6 is a flowchart for describing the ranking list display method in the game system according to the embodiment of the invention.

Next, referring to a flowchart of FIG. 6, a description is given of the ranking list display method in the game system according to the embodiment of the invention.

As has been described above, the ranking list display method in the game system of the embodiment is executed mainly by the server-side ranking list display process program 22, and display-related processes are executed on the client side. However, the process execution is not limited to this example, and a part or all of the ranking list display process, which is executed on the server side, may be executed on the client side. Accordingly, in the embodiment described below, even in the case where a process is described as a server-side process, this process may be executed on the client side. In addition, even in the case where a process is described as a client-side process, this process may be executed on the server side.

To begin with, if a display request for a ranking list has been issued from the mobile phone 4, the server 10 searches for a pointer setup target user ID 46 which is managed by a user ID 44 which has issued the display request for the ranking list, acquires the rank data 42 of the user ID 44 associated with the ranking data 41 by using the searched pointer setup target user ID 46 as the key, and sends the acquired rank data 42 to the mobile phone 4. Thereby, the mobile phone 4 acquires the rank data 42 of the searched pointer setup target user ID 46 (S1).

Next, a display range is computed in the server 10 (S2). In the computation of the display range, for example, the display range is determined based on the rank data 42 of the ranking data 41, such as the first rank to the ninth rank in the ranking list, but the computation of the display range is not limited to this example. In addition, the display range may be computed based on screen scroll on the mobile phone 4.

Subsequently, the ranking data 41 is acquired (S3). In the meantime, as regards the acquisition of the ranking data 41, all the ranking data 41 may be acquired, or a part of the ranking data 41 may be acquired.

Thereafter, the ranking data 41 and the display range computed in S2 are transmitted to the mobile phone 4. Thereby, the ranking data 41 of the computed display range is displayed on the mobile phone 4.

Next, in the server 10, it is determined whether the display range computed in S2 includes the rank indicated by the rank data 42 acquired in S1 (S5). If it is determined in S5 that the display range does not include the rank indicated by the rank data 42 acquired in S1, it is determined whether the display range is above the rank indicated by the ranking data 42 acquired in S1 (S6).

If it is determined in S6 that the display range is not above the rank indicated by the ranking data 42 acquired in S1, the pointer is rotated upward in the mobile phone 4 (S8) and the pointer is displayed (S10). If it is determined in S6 that the display range is above the rank indicated by the ranking data 42 acquired in S1, the pointer is rotated downward in the mobile phone 4 (S7) and the pointer is displayed (S10).

On the other hand, if it is determined in S5 that the display range includes the rank indicated by the rank data 42 acquired in S1, the pointer is rotated sideward (S9), and the pointer is displayed (S10).

Figure 7:
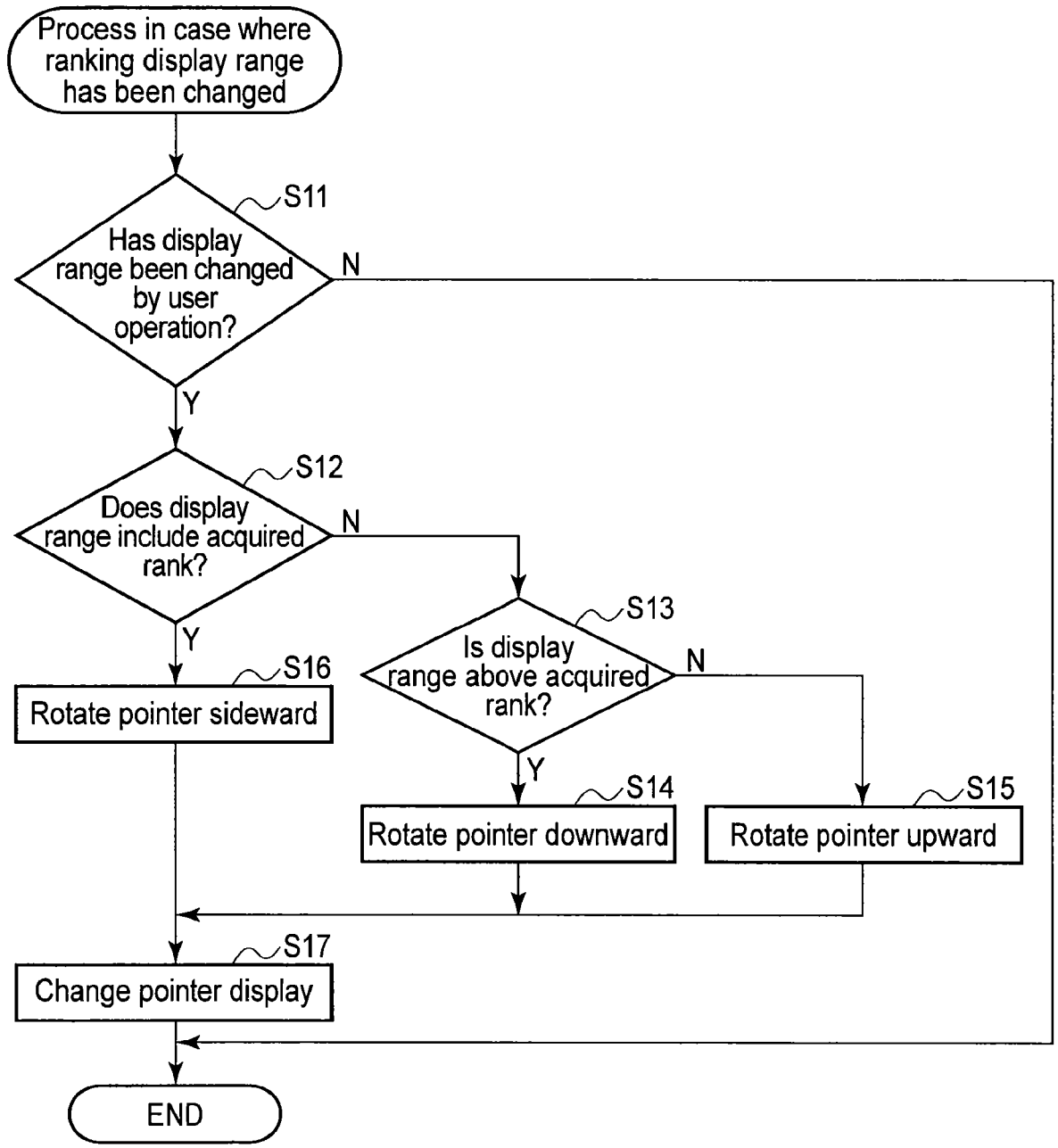
FIG. 7 is a flowchart for describing the ranking list display method in a case where a ranking display range in the game system according to the embodiment of the invention has been changed.

FIG. 7 is a flowchart for describing the ranking list display method in a case where a ranking display range has been changed.

To start with, it is determined whether the display range has been changed by a user operation (e.g. scroll, slide) (S11). When it has been determined that the display range has been changed, it is determined whether the display range computed in S2 includes the rank indicated by the rank data 42 acquired in S1 (S12). If it is determined in S12 that the display range does not include the rank indicated by the rank data 42 acquired in S1, it is determined whether the display range is above the rank indicated by the ranking data 42 acquired in S1 (S13).

If it is determined in S13 that the display range is not above the rank indicated by the ranking data 42 acquired in S1, the pointer is rotated upward in the mobile phone 4 (S15) and the pointer display is changed (S17). If it is determined in S13 that the display range is above the rank indicated by the ranking data 42 acquired in S1, the pointer is rotated downward in the mobile phone 4 (S14) and the pointer display is changed (S17).

On the other hand, if it is determined in S12 that the display range includes the rank indicated by the rank data 42 acquired in S1, the pointer is rotated sideward (S16), and the pointer display is changed (S17).

In the meantime, when there are a plurality of pointer setup target user IDs 46, the process from S5 to S10 and the process from S12 to S17 are executed with respect to each of the pointer setup target user IDs 46. Specifically, the pointer is displayed in association with each of the pointer setup target user IDs 46.

Figure 8:
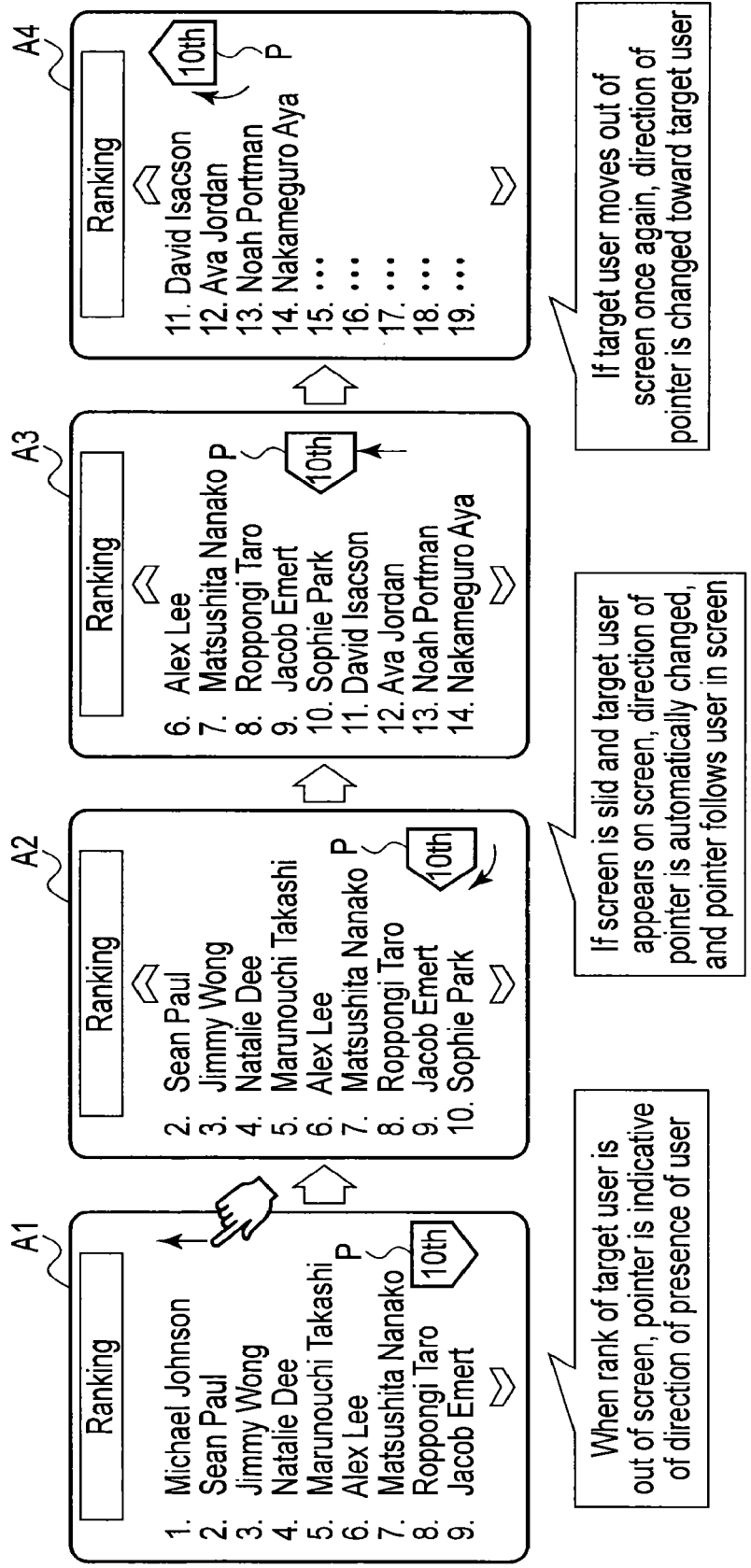
FIG. 8 is a view illustrating a pointer of a pointer setup target user (user himself(herself)/friend/arbitrary designated user) on the ranking displayed on the mobile phone 4.

FIG. 8 is a view illustrating a pointer of a pointer setup target user (user himself(herself)/friend/arbitrary designated user) on the ranking displayed on the mobile phone 4.

In FIG. 8, the case in which the setup target user of a pointer P is a 10th rank is described by way of example.

A screen A1 displays a first rank to a ninth rank in the ranking, and the setup target user of the pointer P is the 10th rank, and thus the user name is not displayed. Accordingly, a downward pointer P indicative of a direction of the presence of the user is displayed. In the pointer P, the rank of of the setup target user of the pointer P is displayed.

A screen A2 shows a case in which the user has slid the screen A1 upward, and a second rank to the 10th rank are displayed. On this screen, since the pointer setup target user is displayed, the pointer P is rotated in a parallel direction and is displayed. In this case, the pointer P is displayed at a position alongside the pointer setup target user.

A screen A3 shows a case in which the user has slid the screen A2 upward, and a 6th rank to a 14th rank are displayed. As illustrated in FIG. 8, the pointer P is displayed such that the pointer P moves in a manner to follow the pointer setup target user.

A screen A4 shows a case in which the user has slid the screen A3 upward, and an 11th rank to a 19th rank are displayed. On the screen A4, since the setup target user of the pointer P is out of the screen once again, the pointer P is rotated upward and displayed.

Figure 9:
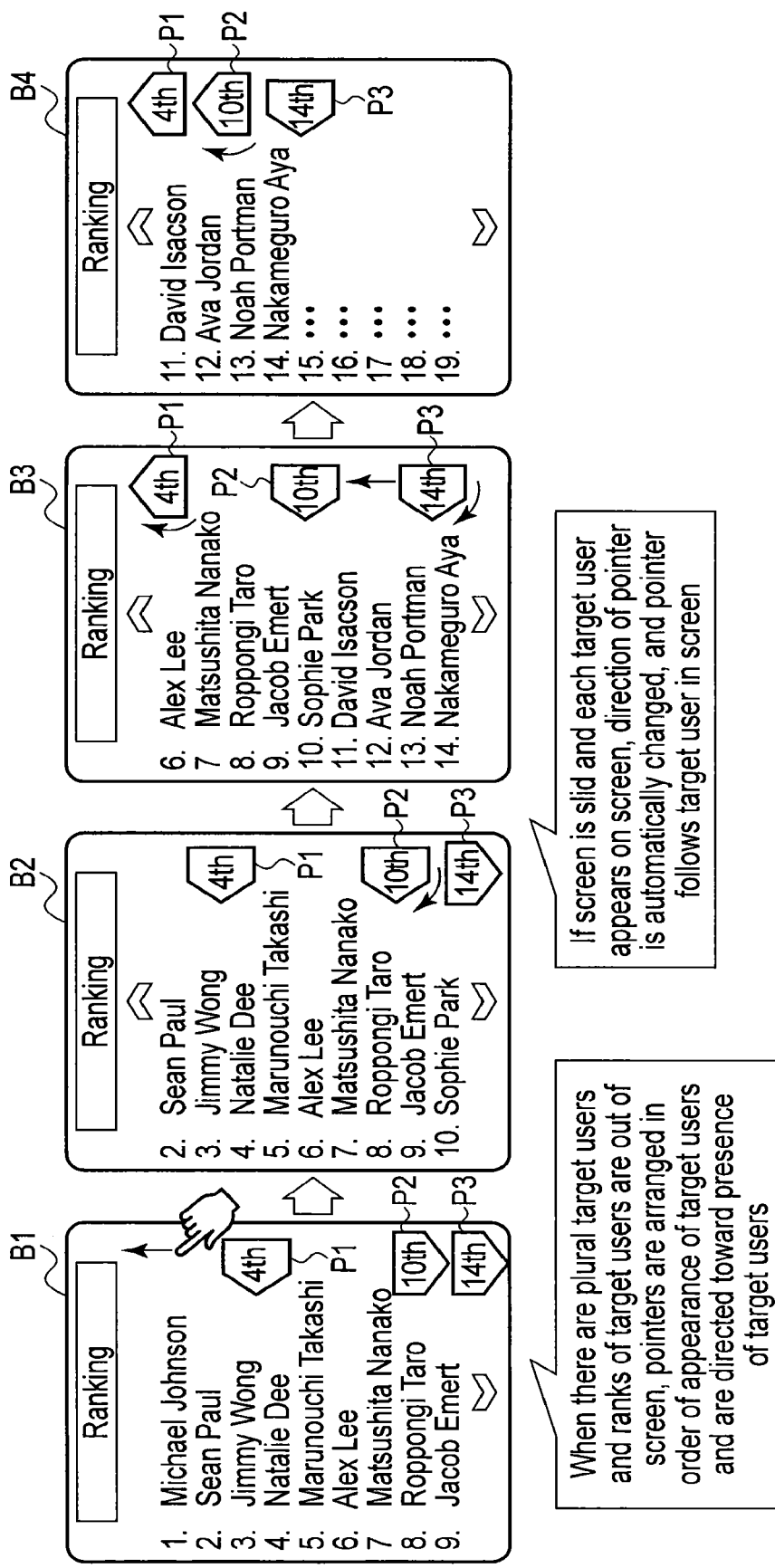
FIG. 9 is a view illustrating a case in which there are a plurality of pointers of pointer setup target users (user himself(herself)/friend/arbitrary designated user) on the ranking displayed on the mobile phone 4.

FIG. 9 is a view illustrating a case in which there are a plurality of pointers of pointer setup target users (user himself(herself)/friend/arbitrary designated user) on the ranking displayed on the mobile phone 4.

In FIG. 9, the case in which the setup target users of pointers P1 to P3 are a 4th rank, a 10th rank and a 14th rank is described by way of example.

A screen B1 displays a first rank to a 9th rank in the ranking, and the setup target users of the pointers P2 and P3 are the 10th rank and 14th rank, and thus the user names thereof are not displayed. Accordingly, downward pointers P2 and P3 indicative of the direction of the presence of the users is displayed. In the pointer P, the rank of of the setup target user of the pointer P is displayed. On the other hand, since the setup target user of the pointer P1 is the 4th rank and is displayed on the screen B1, the pointer P1 is rotated in a parallel direction and is displayed. In this case, the pointer P1 is displayed at a position alongside the pointer setup target user.

A screen B2 shows a case in which the user has slid the screen B1 upward, and the second rank to the 10th rank are displayed. On this screen, since the pointer setup target user of the pointer P2 is displayed on the screen, the pointer P2 is rotated in a parallel direction and is displayed. In this case, the pointer P2 is displayed at a position alongside the pointer setup target user.

A screen B3 shows a case in which the user has slid the screen B2 upward, and the sixth rank to 14th rank are displayed. As illustrated in FIG. 9, the pointer P2 is displayed such that the pointer P2 moves in a manner to follow the pointer setup target user. In addition, on the screen B3, since the setup target user of the pointer P1 is out of the screen, the pointer P1 is rotated upward and displayed. On the other hand, since the pointer setup target user of the pointer P3 is displayed on the screen, the pointer P3 is rotated in the parallel direction and is displayed.

A screen B4 shows a case in which the user has slid the screen B3 upward, and the 11th rank to 19th rank are displayed. On the screen B4, since the setup target user of the pointer P2 is out of the screen once again, the pointer P2 is rotated upward and displayed.

Next, referring to a flowchart of FIG. 10, a description is given of a transition of the screen in a case where a pointer displayed on the screen has been tapped.

To start with, it is determined whether a pointer select operation (tap) has been executed (S21). If it is determined in S21 that the pointer select operation has been executed, ranking data 41 including the rank data 42 of the pointer setup target user ID 46 is acquired (S22).

Next, the pointer P is rotated sideward (S23), the ranking display range is changed such that the rank of the pointer setup target user is displayed at the center (S24), and the process is terminated.

Thereby, the ranking information of the pointer setup target user ID 46 is displayed.

Figure 11:
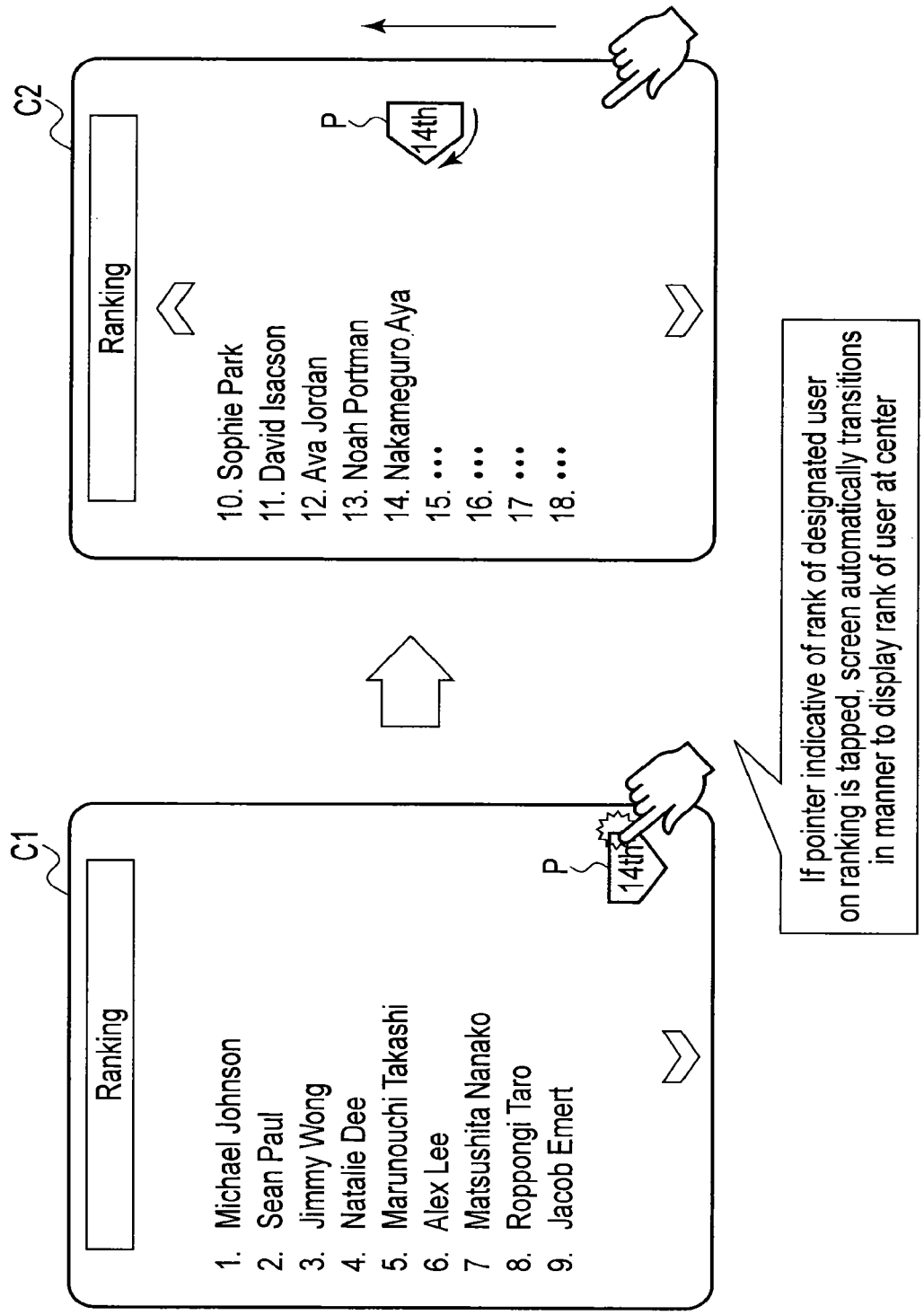
FIG. 11 is a view illustrating a case in which, when a pointer P of a 14th rank displayed on a screen C1 has been tapped, the screen C1 transitions to a screen C2 which displays the 14th rank of the setup target user at the center.

FIG. 11 is a view illustrating a case in which when the pointer P of the 14th rank displayed on a screen C1 has been tapped, the screen C1 transitions to a screen C2 which displays the 14th rank of the setup target user at the center. In the above description, the case of executing a "tap" operation has been described, but the tap may be replaced with other operations. In addition, the transition of the screen includes scroll, jump, etc., and the method of the transition is not specified.

In the above-described example, when the pointer is tapped, the rank of the pointer setup target user 46 is displayed at the center. However, by rotating the pointer, a transition may be made to the screen which displays the rank of the pointer setup target user 46 at the center. For example, by rotating a downward or upward pointer sideward by a user operation, a transition may be made to the screen which displays the rank of the pointer setup target user 46 at the center.

Next, referring to a flowchart of FIG. 12, a description is given of a method of referring to detailed information from a pointer indicative of the setup target user on the ranking.

To start with, it is determined whether a pointer select operation (detail display) has been executed (S31). In this case, the pointer select operation (detail display) is, for example, a double-tap or a long-press of the pointer, but is not limited to such examples.

If it is determined in S31 that the pointer select operation (detail display) has been executed, ranking data 41 including the rank data 42 of the pointer setup target user ID 46 is acquired (S32). Then, based on the acquired ranking data, a detailed information screen is displayed (S33).

Figure 13A:
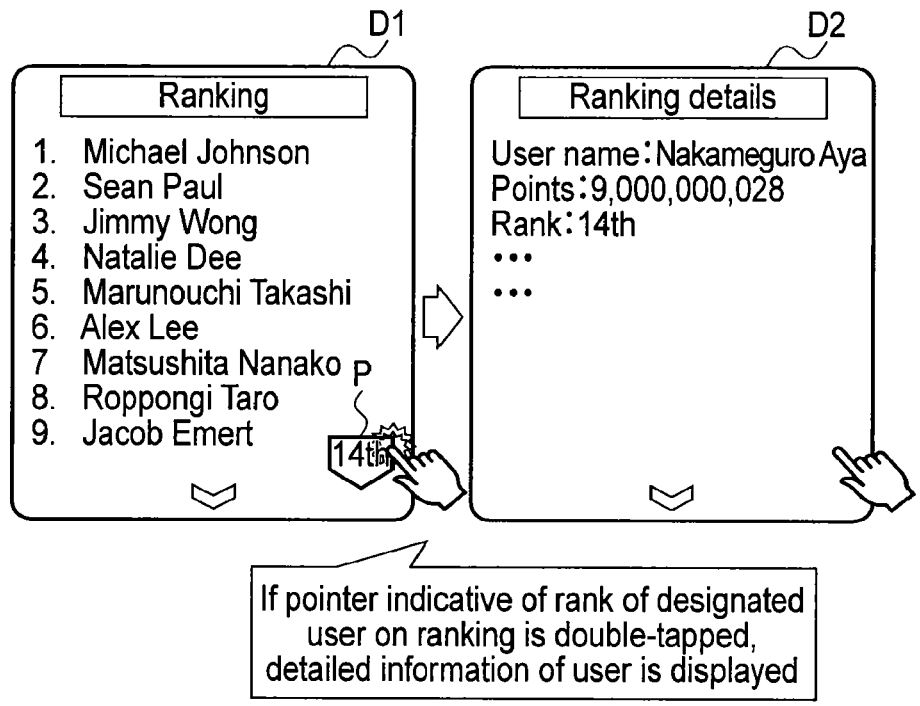
FIG. 13A is a view illustrating a detail display screen which is displayed when a pointer select operation (double-tap) has been executed.
Figure 13B:
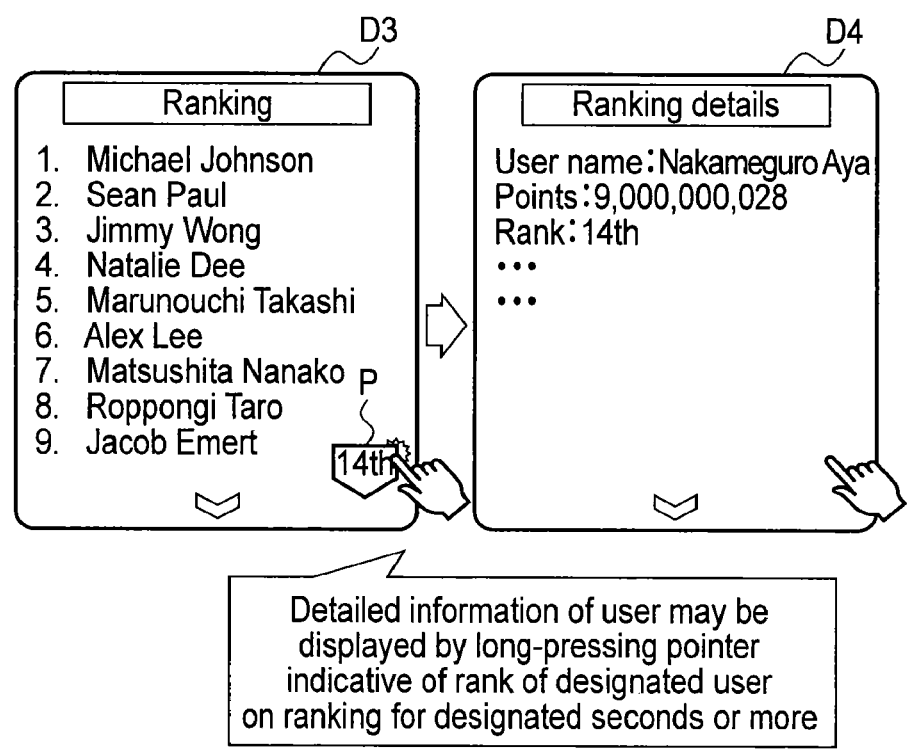
FIG. 13B is a view illustrating a detail display screen which is displayed when a pointer select operation (long-press) has been executed.

FIG. 13A is a view illustrating a detail display screen which is displayed when a pointer select operation (double-tap) has been executed. If a pointer select operation is executed on a pointer P displayed on a screen D1, the detailed information of the pointer setup target user of the pointer P is displayed, as shown on a screen D2. In another example, as illustrated in FIG. 13B, if a pointer select operation (long-press) is executed on a pointer P displayed on a screen D3, the detailed information of the pointer setup target user of the pointer P is displayed, as shown on a screen D4.

Figure 14:
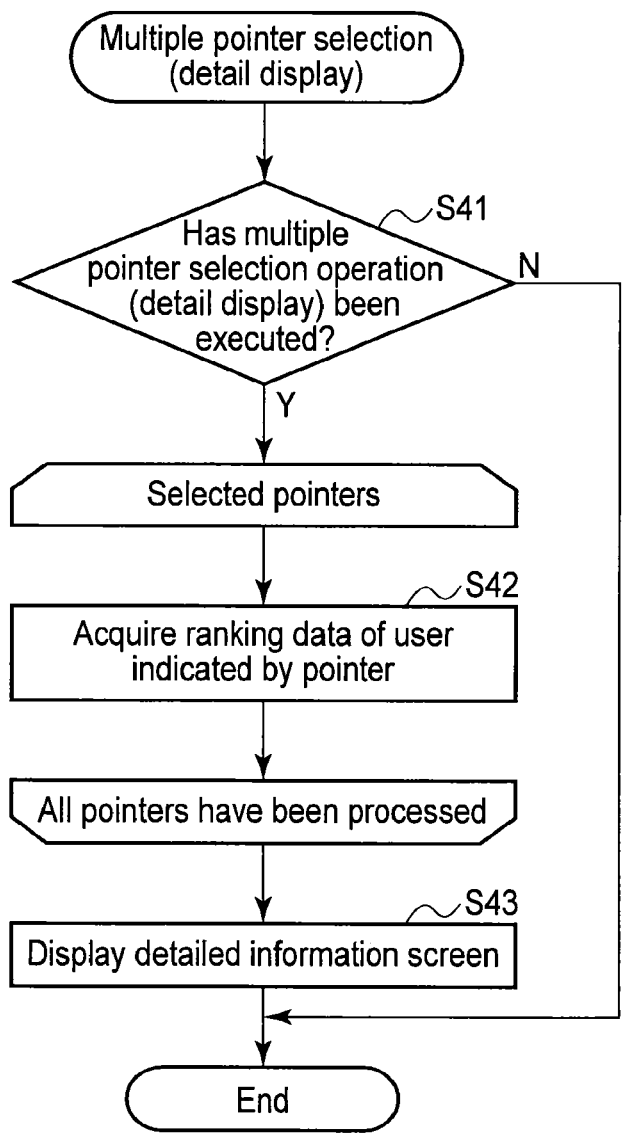
FIG. 14 is a flowchart for describing a method of referring to a plurality of detailed information pieces from a plurality of pointers indicative of a plurality of setup target users on the ranking.

Next, referring to a flowchart of FIG. 14, a description is given of a method of referring to a plurality of detailed information pieces from a plurality of pointers indicative of a plurality of setup target users on the ranking.

To start with, it is determined whether a multiple pointer select operation (detail display) has been executed (S41). In this case, the multiple pointer select operation (detail display) is, for example, a simultaneous tap of plural pointers on the ranking, but is not limited to this example.

If it is determined in S41 that the multiple pointer select operation (detail display) has been executed, ranking data 41 of the pointer setup target user IDs 46 is acquired (S42). The process of S42 is executed for all of the pointer setup target user IDs 46 (all of the pointers). Then, based on the acquired ranking data, a detailed information screen is displayed (S43).

Figure 15:
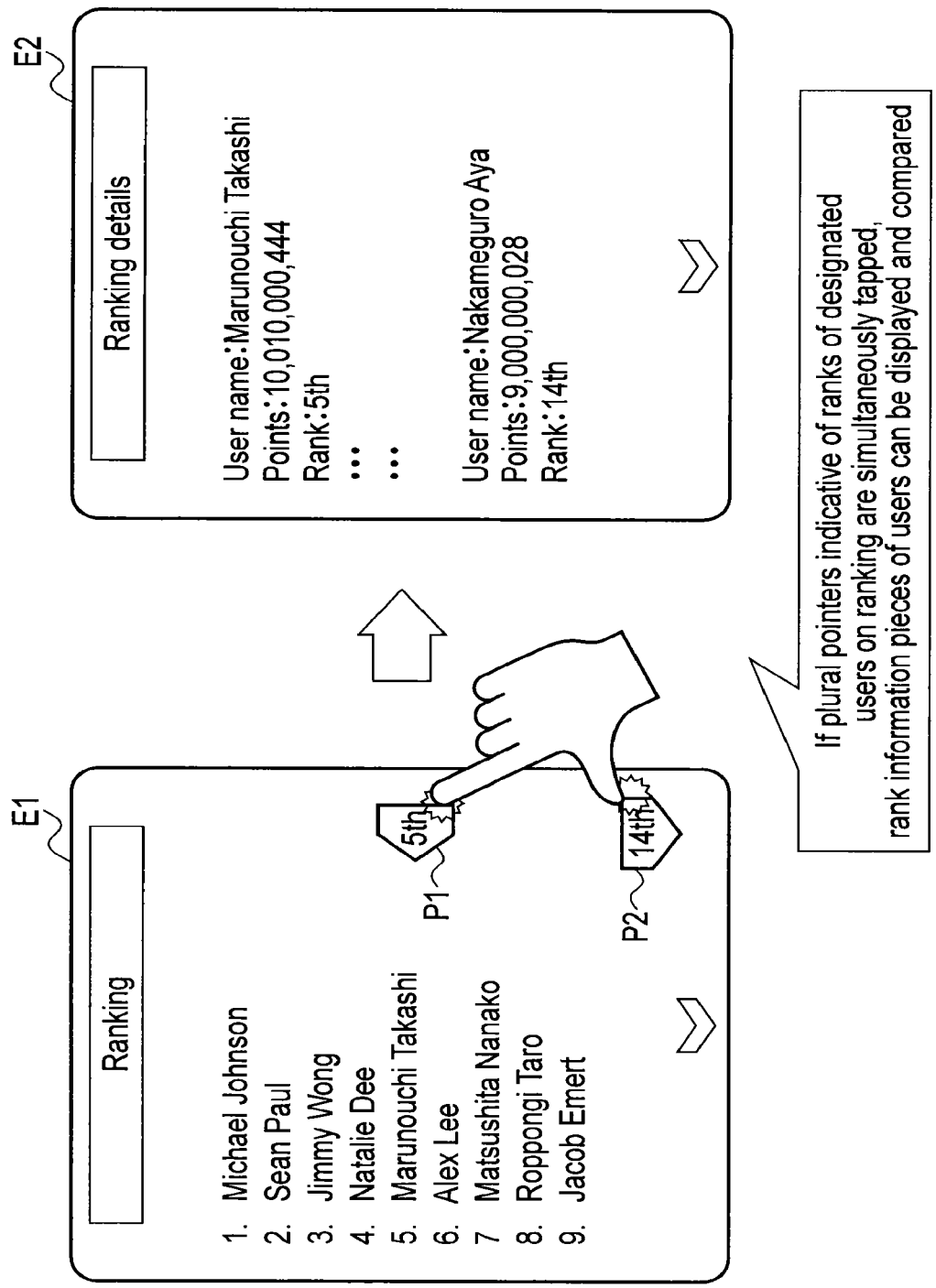
FIG. 15 is a view illustrating a detail display screen which is displayed when a multiple pointer select operation (detail display) has been executed.

FIG. 15 is a view illustrating a detail display screen which is displayed when a multiple pointer select operation (detail display) has been executed. If a multiple pointer select operation (simultaneous multiple tap) is executed on pointers P1 and P2 displayed on a screen E1, the detailed information pieces of the pointer setup target users 46 of the pointers P1 and P2 are displayed, as shown on a screen E2.

Figure 16:
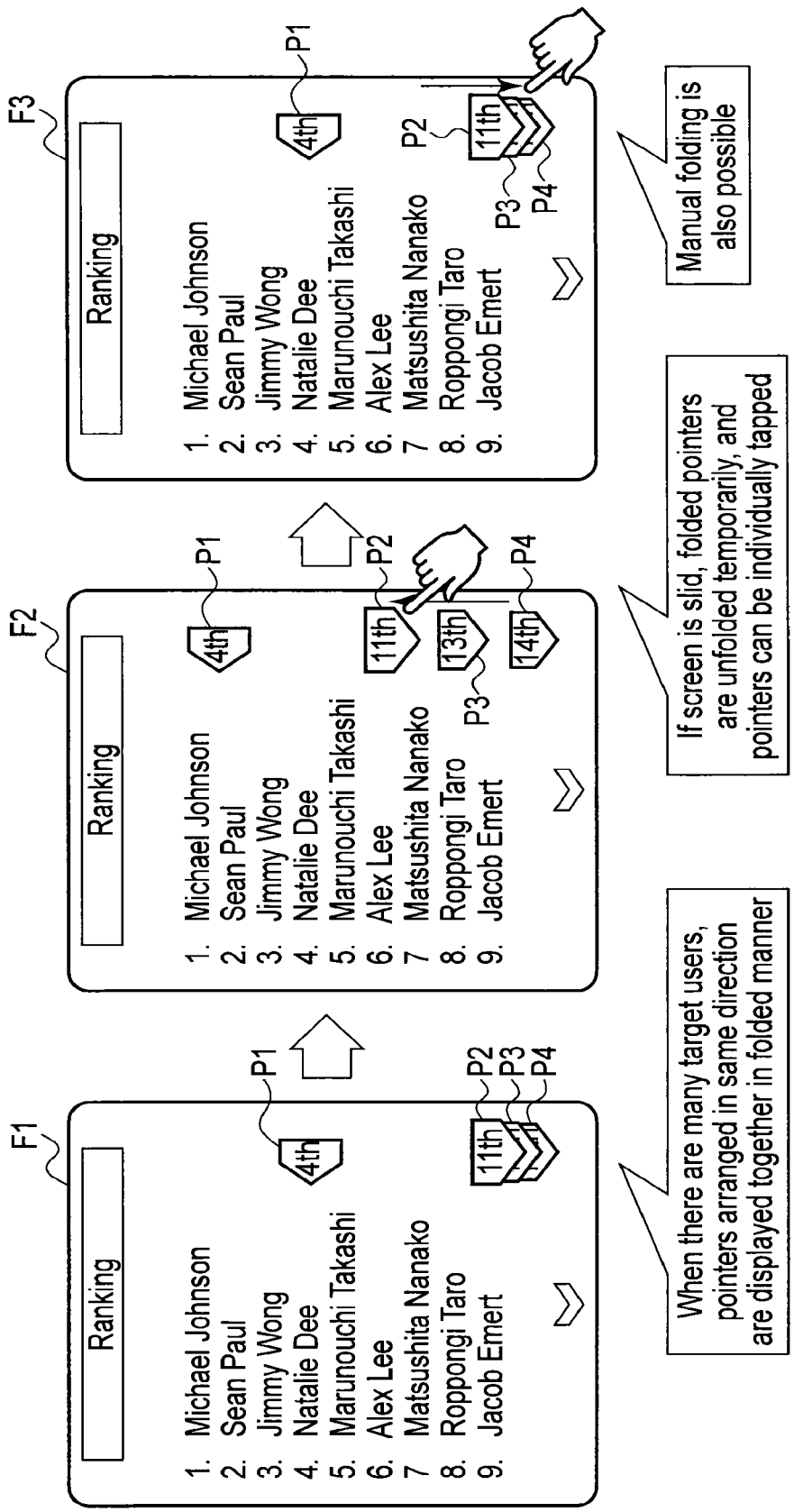
FIG. 16 is a view illustrating an example of a method of displaying pointers in the embodiment of the invention.

FIG. 16 is a view illustrating an example of a pointer display method in the embodiment of the invention.

As illustrated in FIG. 16, when there are many target users, the pointers, which are arranged in the same direction, are displayed together in a folded manner. Specifically, when the number of pointer setup target user IDs 46 exceeds a predetermined number, the pointers in the same direction are displayed together in the folded manner. A screen F1 in FIG. 16 illustrates an example in which pointers P2 to P4 in the same direction are displayed together in the folded manner. A screen F2 illustrates an example in which the user has slid the pointers P2 to P4, and the pointers P2 to P4, which were temporarily displayed together in the folded manner, have been unfolded and displayed. Thereby, the unfolded pointers P2 to P4 can be individually selected. A screen F3 illustrates an example in which the user has slid the unfolded pointers P2 to P4, and the pointers P2 to P4 have been restored to the folded state.

In the meantime, in the above-described embodiment, the case in which all pointers of pointer setup target users are displayed has been described. Alternatively, only a pointer of a pointer setup target user in a predetermined range of the ranking of the user himself/herself may be displayed, or none of the pointers of the pointer setup target users may be displayed.

The shape of the pointer is not limited to the illustrated shape. For example, the pointer may have the shape of a finger, or may be a sign of inequality. It should suffice if the pointer is representative of the direction of the rank of the user of the pointer setup target user ID 46.

In addition, the case has been illustrated that the rank is displayed within the pointer. However, the information displayed within the pointer is not limited to this example, and a user name, for instance, may be displayed within the pointer. Besides, the color or shape of the pointer may be varied in accordance with the kind of user.

Therefore, according to the present embodiment, even in the case of a user who is not displayed on the ranking list screen, the ranking of the user who is the ranking confirmation target can easily be confirmed by the direction of the pointer of the user.

Furthermore, the direction of the pointer is changed in accordance with the transition of the screen of the ranking list. Thus, even if the ranking list screen is transitioned, the ranking of the user of the ranking confirmation target can easily be confirmed.

In addition, by selecting a pointer, a transition can be made to the ranking list display screen of the user indicated by the pointer. Thus, the ranking of the user of the confirmation target can easily be confirmed.

By selecting a pointer (detail display), a transition can be made to the screen displaying the detailed information of the user indicated by the pointer. Thus, without making a transition to the ranking list display screen on which the user indicated by the pointer is displayed, the ranking confirmation of the user of the ranking confirmation target can easily be executed. In addition, by selecting plural pointers (detail display), a transition can be made to the screen displaying the detailed information of plural users indicated by the pointers. Thus, the ranking confirmation of the users of the ranking confirmation targets can easily be executed.

Furthermore, according to the present embodiment, pointers in the same direction, which are displayed on the ranking list display screen, can be displayed together in an unfoldable/foldable manner. Thus, even in the case where there are many users of ranking confirmation targets, ranking confirmation can easily be made.

While certain embodiments have been described, these embodiments have been presented by way of example only, and are not intended to limit the scope of the inventions. The novel embodiments described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The methods, which have been described in connection with the present embodiment, may be stored as a computer-executable program in a recording medium such as a magnetic disk (e.g. floppy (trademark) disk, hard disk), an optical disk (e.g. CD-ROM, DVD, MO) or a semiconductor memory (e.g., ROM, RAM, flash memory), or may be transmitted via communication media and distributed. The program stored in the recording medium includes a setup program which configures software means (including not only an execution program, but also a table or data structure) in the computer. The computer, which realizes the present apparatus, reads the program that is stored in the recording medium or, in some cases, constructs the software means by the setup program, and executes the above-described process by the operation being controlled by the software means. The recording medium, in the context of the specification, includes not only a medium for distribution, but also a storage medium, such as a magnetic disk or a semiconductor memory, which is provided in the computer or in a device that is connected via a network.

What is claimed is:

1. A method performed by an electronic device, the method comprising:
storing a target user identification corresponding to a target user who is to be designated by a pointer, the target user identification being stored in association with a user identification of a user of users, the target user being another user who is associated with the user based on a relationship;
controlling, by circuitry, a communication interface of the electronic device to receive a ranking list of the users;
displaying, by the circuitry, the pointer that corresponds to a rank of the target user in the ranking list received by the communication interface of the electronic device; and
determining, by the circuitry, based on a user input at the electronic device, whether a display range of the ranking list is changed, wherein
when the rank of the target user to whom the pointer corresponds is within the display range, the displaying displays the pointer adjacent to the rank of the target user to whom the pointer corresponds and pointing to the target user, such that both the pointer and the rank of the target user are displayed on a same screen and the pointer moves along with the rank of the target user as a scrolling operation is performed.

2. The method of claim 1, further comprising:
determining, when it is determined that the display range is changed, a direction of the pointer based on the changed display range, the direction of the pointer being different depending on whether the rank of the target user to whom the pointer corresponds is included in the changed display range, such that the pointer is in a first direction in response to the rank of the target user to whom the pointer corresponds being included in the changed display range, and the pointer is in a second direction in response to the rank of the target user to whom the pointer corresponds not being included in the changed display range, the first direction being different from the second direction.

3. The method of claim 2, wherein:
the displaying displays the pointer having the determined direction.

4. The method of claim 2, further comprising:
determining whether the pointer is selected; and
changing, when it is determined that the pointer is selected by a first operation and when the rank of the target user to whom the pointer corresponds is not included in the display range, the display range of the ranking list to a new display range of the ranking list that includes the rank of the target user to whom the pointer corresponds.

5. The method of claim 4, further comprising:
displaying first detailed information of the target user when it is determined that the same pointer is selected by a second operation different from the first operation.

6. The method of claim 5, wherein:
the first operation is a tap, and
the second operation is a double-tap or a long-press.

7. The method of claim 1, further comprising:
displaying, when it is determined that the pointer and an other pointer are selected simultaneously by a multiple pointer selection operation, first detailed information of the target user and second detailed information of an other target user, the first detailed information and second detailed information being displayed together in a simultaneous fashion.

8. The method of claim 7, wherein:
the first detailed information includes at least one of a name of the target user, a total number of points associated with the target user, and the rank of the target user, and
the second detailed information includes at least one of a name of the other target user, a total number of points associated with the other target user, and a rank of the other target user.

9. The method of claim 7, wherein:
the multiple pointer selection operation includes multiple taps, which include a first tap performed on the pointer and a second tap performed on the other pointer.

10. The method of claim 1, further comprising:
maintaining, in response to the scrolling operation being performed based on another user input operation at the electronic device, the pointer adjacent to the rank of the target user and pointing to the target user as the scrolling operation is performed.

11. The method of claim 1, wherein:
the pointer is a first pointer when the rank of the target user in the ranking list is within a currently displayed range of the ranking list,
the pointer is a second pointer when the rank of the target user in the ranking list is above the currently displayed range of the ranking list, and
the pointer is a third pointer when the rank of the target user in the ranking list is below the currently displayed range of the ranking list.

12. The method of claim 1, further comprising:
displaying pointers of a plurality of pointers, which indicate a same direction in relation to a currently displayed range, in a foldable and unfoldable manner.

13. The method of claim 1, wherein:
the electronic device is a client.

14. The method of claim 1, wherein:
a client includes the circuitry and the communication interface configured to communicate with a computer over a network.

15. An electronic device comprising:
a communication interface; and
circuitry configured to
store a target user identification corresponding to a target user who is to be designated by a pointer, the target user identification being stored in association with a user identification of a user of users, the target user being another user who is associated with the user based on a relationship,
control the communication interface of the electronic device to receive a ranking list of the users,
display the pointer that corresponds to a rank of the target user in the ranking list received by the communication interface of the electronic device, and
determine, based on a user input at the electronic device, whether a display range of the ranking list is changed, wherein
the circuitry is configured to, when the rank of the target user to whom the pointer corresponds is within the display range, display the pointer adjacent to the rank of the target user to whom the pointer corresponds and pointing to the target user, such that both the pointer and the rank of the target user are displayed on a same screen and the pointer moves along with the rank of the target user as a scrolling operation is performed.

16. A non-transitory computer-readable medium including computer instructions, which when executed by an electronic device, cause the electronic device to:
store a target user identification corresponding to a target user who is to be designated by a pointer, the target user identification being stored in association with a user identification of a user of users, the target user being another user who is associated with the user based on a relationship;
control a communication interface of the electronic device to receive a ranking list of the users;
display the pointer that corresponds to a rank of the target user in the ranking list received by the communication interface of the electronic device; and
determine, based on a user input at the electronic device, whether a display range of the ranking list is changed, wherein
the computer instructions, when executed by the electronic device, further cause the electronic device to display, when the rank of the target user to whom the pointer corresponds is within the display range, the pointer adjacent to the rank of the target user to whom the pointer corresponds and pointing to the target user, such that both the pointer and the rank of the target user are displayed on a same screen and the pointer moves along with the rank of the target user as a scrolling operation is performed.

* * * * *